United States Patent
Gabbai

[19]

[11] Patent Number: 6,130,416
[45] Date of Patent: Oct. 10, 2000

[54] FOOD HEATING DEVICE

[75] Inventor: Cynthia C. W L Gabbai, Kowloon, The Hong Kong Special Administrative Region of the People's Republic of China

[73] Assignee: Ying Fat Electric Products Ltd, Kowloon, The Hong Kong Special Administrative Region of the People's Republic of China

[21] Appl. No.: 09/208,424

[22] Filed: Dec. 10, 1998

[30] Foreign Application Priority Data

Dec. 11, 1997 [GB] United Kingdom .................... 9726249

[51] Int. Cl.⁷ .................................. H05B 3/06; A47J 3/00
[52] U.S. Cl. ................................ 219/524; 99/372; 99/374
[58] Field of Search ................................ 219/524; 99/422, 99/424, 426, 447, 372, 374, 376–380

[56] References Cited

U.S. PATENT DOCUMENTS

| | | | |
|---|---|---|---|
| 3,963,898 | 6/1976 | Tuckwell | 219/524 |
| 4,002,112 | 1/1977 | Snyder | 99/376 |
| 4,091,720 | 5/1978 | Wheeler | 99/375 |

FOREIGN PATENT DOCUMENTS

| | | |
|---|---|---|
| 648245 | 4/1994 | Australia . |
| 665332 | 12/1995 | Australia . |
| 7298094 | 12/1995 | Australia . |
| 58652/94 | 3/1999 | Australia . |
| 0 696 430 | 2/1996 | European Pat. Off. . |
| 1 575 264 | of 0000 | United Kingdom . |
| WO94/22354 | 10/1994 | WIPO . |

OTHER PUBLICATIONS

WPI Abstract Accession No. 86–000197–01 & DD226771 A (GERATE) Apr. 9, 1985 (see abstract).

*Primary Examiner*—Teresa Walberg
*Assistant Examiner*—Thor Campbell
*Attorney, Agent, or Firm*—Nixon & Vanderhye P.C.

[57] ABSTRACT

A food heating device such as a sandwich toaster or contact grill, comprising two hingedly connected parts (1) upon which heating elements (6) fixed within heat distribution bodies (7) are mounted. Contact plates (9) against which the food is heated are arranged to abut the heat distribution bodies (7) via complementary curved contact surfaces to provide improved heat distribution. The contact plates can be detached from the food heating device, thereby allowing for easy cleaning.

11 Claims, 3 Drawing Sheets

FOOD HEATING DEVICE

BACKGROUND OF THE INVENTION

1. Field of the Invention

The present invention relates to food heating devices. More particularly the present invention relates to devices having a heating element for heating a contact plate that contacts food during heating, for example, a sandwich toaster or a contact grill.

2. Description of the Prior Art

Food heating devices with heating elements and contact plates are known in the prior art. Such devices often suffer from the problem that the parts of the device contacting the food, i.e. the contact plates, need to be cleaned but this is awkward when the plates are permanently fixed in place. Furthermore, such plates cannot be cleaned in an automatic dishwasher, such machines are becoming increasingly common in the home.

A further problem associated with fixed contact plate food heaters is their lack of versatility. Contact plate food heating devices can be used for heating different foods, the contact plates suitable for one food may be different to those suitable for another. Thus a food heating device with detachable plates has the added advantage that the plates can be interchanged with others having a different form, thereby allowing the device to be used to heat different foods.

Food heating devices with detachable plates are known in the prior art. One such device comprises contact plates arranged at a distance from the heating elements with and air gap therebetweeen. This results in poor thermal transfer between the heating elements and the contact grill. Such a device has the disadvantages of being inefficient and taking a long time to warm up.

European Published Patent Application EP-A-0,646,344 discloses a sandwich toaster wherein the two hingedly connected parts are separable, and when separated, each may be placed in a dishwasher for cleaning. This device has the disadvantage that it is not just the contact plates that are detached but the contact plates connected to the heating elements, which is an expensive arrangement as each plate needs a releasable electrical connection. It has the further disadvantage that the heating elements may be degraded by repeated washings.

British Patent GB-A-1,575,264 discloses a device in which the heating elements are embedded within a full-width flat plate upon which the contact surfaces then sit.

SUMMARY OF THE INVENTION

It is therefore an object of this invention to provide a food heating device that reduces the above disadvantages.

Accordingly the invention provides a food heating device comprising a first part and a second part hingedly connected thereto, at least one of said parts comprising:

(i) a heating element;
(ii) a heat distribution body in thermal contact with said heating element; and
(iii) a contact plate for contacting food during heating;
(iv) wherein said contact plate is detachable from the rest of the food heating device, said heat distribution body and said contact plate have respective complementary contact surfaces of a curved cross section, such that, when assembled in the food heating device, said contact plate and said heat distribution body are in conductive thermal conduct via said complementary contact surfaces.

The direct conductive thermal contact between the heat distribution body and the contact plate allows for rapid warm up and efficient operation whilst permitting the use of simple, thin and inexpensive removable contact plates. The complementary contact surfaces have a curved cross section. This has the advantages that the surfaces are self seating and that the chances of them locking in position, as a result of uneven thermal expansion, are reduced.

It will also be appreciated that in order to reduce hot spots and uneven heat transfer the heat distribution body should be shaped so that a heating element is not much closer to one portion of a complementary contact surface than it is to another portion. Thus in a preferred embodiment the complementary contact surface of the heat distribution body is convex and that of the contact plate concave; and in an even more preferred embodiment the complementary contact surfaces have a cross section that is substantially an arc of a circle.

It will be appreciated that the heat distribution bodies and heating elements could have a variety of shapes, however in preferred embodiments the heat distribution body has a parallel straight sided, curved ends shape. This shape ensures a good distribution of heat across the contact plates without needing excessively long heat distribution bodies and corresponding heating elements that would increase expense.

The heat distribution bodies themselves can be formed in a variety of ways such as by moulding, or casting, however in preferred embodiments the heat distribution bodies are formed from cast aluminium. Cast aluminium is a good conductor, has a low weight and is comparatively inexpensive to produce.

Whilst only one part of the food heating device could be provided with a removable contact plate, it is preferred that both part have these plates.

The food heating device could be manufactured to tolerances sufficient to ensure the heat distribution body accurately abuts the contact plate. However, in order to ensure reliable improved performance it is preferred that the heat distribution body is resiliently biased to abut the contact plate. In this way manufacturing tolerances and wear are less likely to prevent a good conductive thermal contact being established between the heat distribution body and the contact plate.

The heating element needs to be in thermal contact with the heat distribution body in some way, but it is preferred that the heating element is fixed within a receiving channel within the heat distribution body as this provides highly efficient and reliable conductive thermal contact as well as allowing a more compact arrangement.

BRIEF DESCRIPTION OF THE DRAWINGS

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
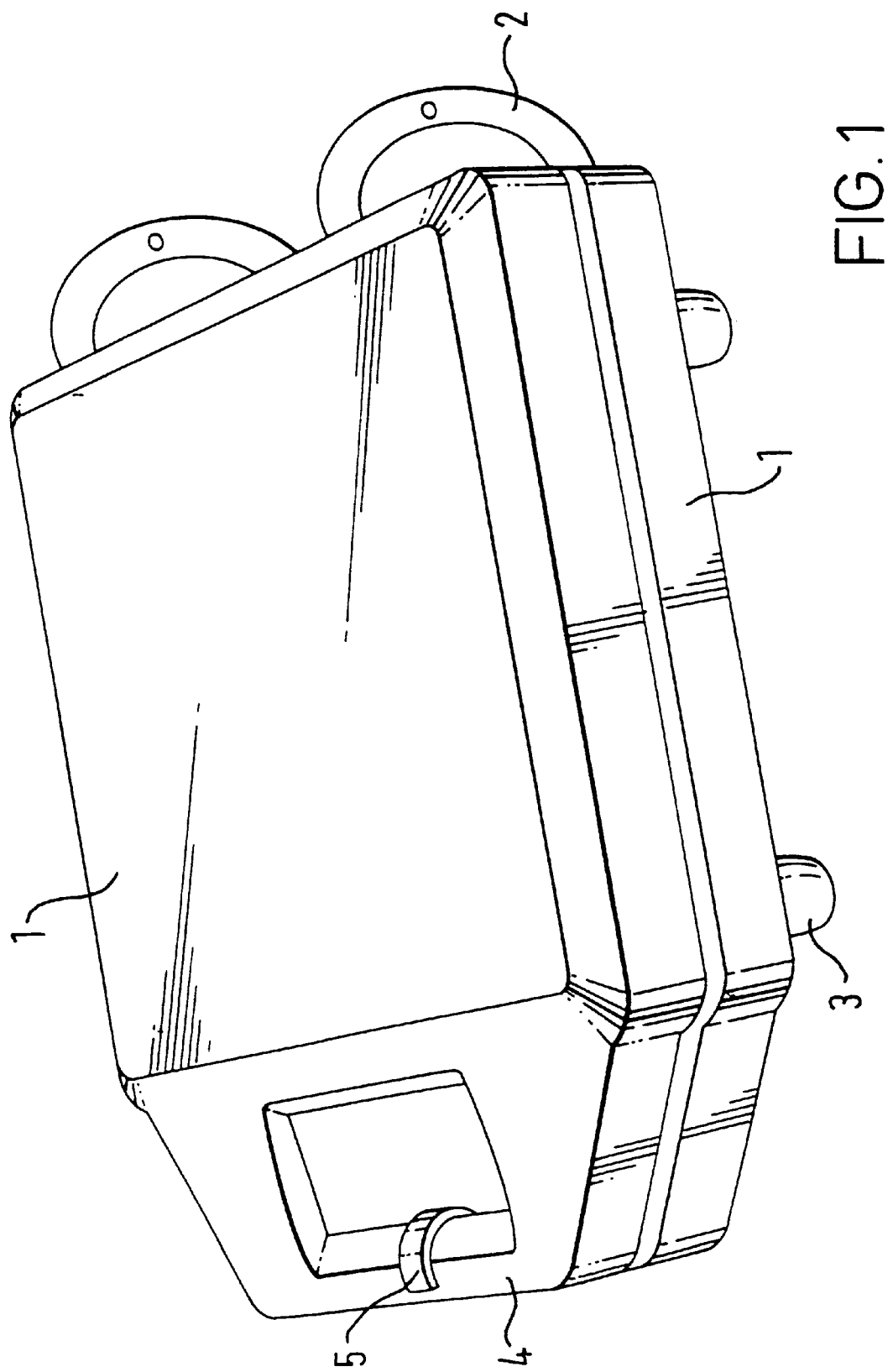
FIG. 1 is a perspective view of a food heating device.

FIG. 1 shows a food heating device comprising two parts 1 connected together by a hinge 2. The lower part has legs 3 to support it on a surface. Both parts comprise a handle 4 integrally formed therewith. The handles facilitate the transport and manipulation of the device. The device also has a clip 5 for holding the handles, and thereby the two hingedly connected parts, together during storage, transport and selectively during cooking.

Figure 2:
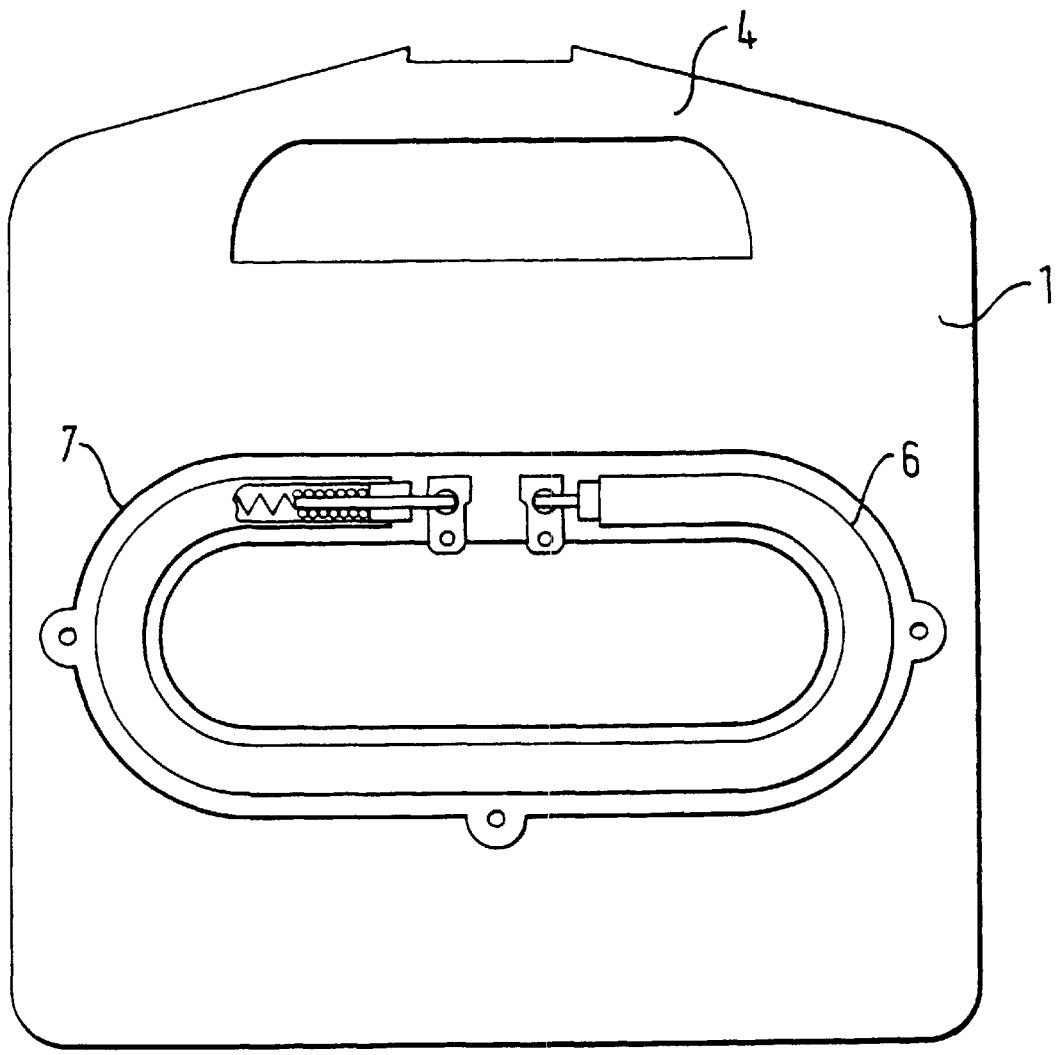
FIG. 2 is a sectional view of one of the hingedly connected parts of the food heating device of FIG. 1.

Referring to FIG. 2, the hingedly connected part 1 comprises a heating element 6 mounted within a heat distribution body 7. A detachable contact plate 9 (see FIG. 3) is in conductive thermal contact with the heat distribution body 7 via complementary contact surfaces. The other of the hingedly connected parts 1 has the same form. The heat distribution body is made of cast aluminium and is fixed onto the hingedly connected parts which are themselves made of pressed sheet steel. The heating element and heat distribution body form a shape with parallel straight sides and curved ends.

Figure 3:
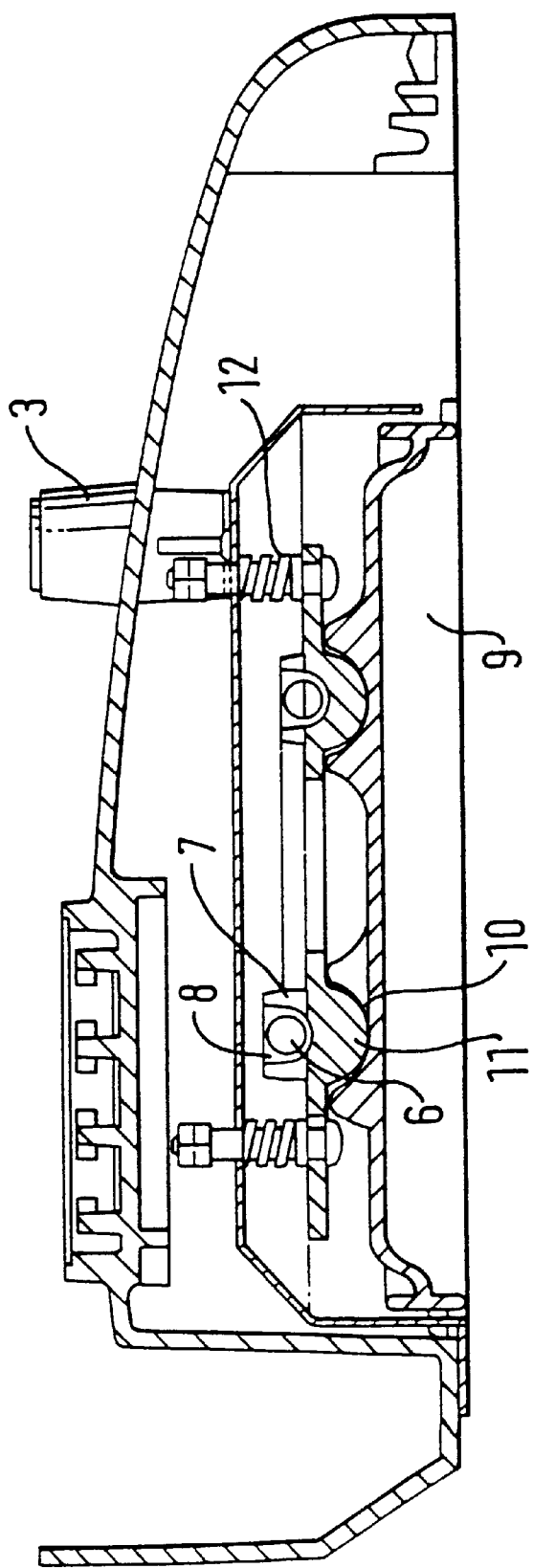
FIG. 3 is a cross section of a side elevation of the lower part of the food heating device of FIG. 1.

As shown most clearly in FIG. 3, the heating element 6 is fixed within a receiving channel 8 in the heat distribution body 7. A detachable contact plate 9, upon which food is heated and which itself is formed of aluminium, has a concave complementary surface 10 in the form of an arc of a circle, which mates with the convex complementary surface 11 of the heat distribution body 7. The heat distribution body 7 is resiliently biased to abut the contact plate 9 by spring members 12 (tapered coil springs) such that, the heat distribution body 7 is in good thermal conductive contact with the contact plate.

The heat distribution body 7 may also have the form of a plate with thickened portions forming the complementary contact surfaces 11 and receiving the heating element 6.

The food heating device illustrated in the aforementioned figures may be used both as a contact grill or as a sandwich toaster depending on the form of the contact plate used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A food heating device comprising a first part and a second part hingedly connected thereto, at least one of said parts comprising:

(i) a heating element;

(ii) a heat distribution body in thermal contact with said heating element; and (iii) a contact plate for contacting food during heating;

(iv) wherein said contact plate is detachable from the rest of the food heating device, said heat distribution body and said contact plate have respective complementary contact surfaces of a curved cross section, such that, when assembled in the food heating device, said contact plate and said heat distribution body are in conductive thermal conduct via said complementary contact surfaces.

2. A food heating device according to claim 1, wherein said heat distribution body has a convex complementary contact surface and said contact plate has a concave complementary contact surface.

3. A food heating device according to claim 2, wherein said complementary contact surfaces have a cross section that is substantially an arc of a circle.

4. A food heating device according to claim 1, wherein said heat distribution body forms a shape with parallel straight sides and curved ends.

5. A food heating device according to claim 1, wherein said heat distribution body is a plate having thickened portions forming said complementary contact surfaces.

6. A food heating device according to claim 1, wherein said heat distribution body is formed from cast aluminium.

7. A food heating device according to claim 1, wherein said food heating device is a sandwich toaster.

8. A food heating device according to claim 1, wherein said food heating device is a contact grill.

9. A food heating device according to claim 1, wherein said heat distribution body is resiliently biased to abut said contact plate.

10. A food heating device according to claim 1, wherein both said first part and said second part comprise a heating element, a heat distribution body and a contact plate.

11. A food heating device according to claim 1, wherein said heating element is fixed within a receiving channel in said heat distribution body.

* * * * *